United States Patent
Tang

(10) Patent No.: US 7,009,336 B2
(45) Date of Patent: Mar. 7, 2006

(54) MICRO-FIELD EMITTER DEVICE FOR FLAT PANEL DISPLAY

(76) Inventor: Yin S. Tang, 201 Rockview, Irvine, CA (US) 92612

( * ) Notice: Subject to any disclaimer, the term of this patent is extended or adjusted under 35 U.S.C. 154(b) by 0 days.

(21) Appl. No.: 11/156,498

(22) Filed: Jun. 17, 2005

(65) Prior Publication Data

US 2005/0218786 A1    Oct. 6, 2005

Related U.S. Application Data

(60) Division of application No. 10/786,766, filed on Feb. 24, 2004, which is a continuation-in-part of application No. 10/754,365, filed on Jan. 8, 2004, now Pat. No. 6,950,239, and a continuation-in-part of application No. 10/775,793, filed on Feb. 9, 2004, now Pat. No. 6,950,237.

(51) Int. Cl.
   *H01J 1/88*  (2006.01)
   *H01J 1/62*  (2006.01)
(52) U.S. Cl. .................... 313/495; 313/310
(58) Field of Classification Search ........ 313/495–497, 313/309–311, 336, 351; 445/6
   See application file for complete search history.

(56) References Cited

U.S. PATENT DOCUMENTS

| 3,582,297 | A | | 6/1971 | Lakeman |
| 3,912,362 | A | | 10/1975 | Hudson |
| 5,067,792 | A | | 11/1991 | Lloyd |
| 5,872,422 | A | * | 2/1999 | Xu et al. ..................... 313/311 |
| 5,973,446 | A | * | 10/1999 | Kaftanov et al. ........... 313/310 |
| 6,584,259 | B1 | | 6/2003 | Rubino |
| 2002/0186940 | A1 | | 12/2002 | Rubino, Jr. |

* cited by examiner

*Primary Examiner*—Joseph Williams
(74) *Attorney, Agent, or Firm*—MacPherson Kwok Chen & Heid, LLP; Tom Chen

(57) ABSTRACT

A device and method for forming a device including electron emitters. The method includes exposing a first face of a sheet of bundled fiber segments to a reactive liquid to allow first ends of the fiber segments to react with the reactive liquid to remove material therefrom. A coating material is deposited on the first face which has the material removed. The method also includes exposing a second face of the sheet of bundled fiber segments to a reactive liquid to allow second ends of the fiber segments to react with the reactive liquid to remove material therefrom to expose the coating material.

9 Claims, 9 Drawing Sheets

MICRO-FIELD EMITTER DEVICE FOR FLAT PANEL DISPLAY

This application is a divisional of application Ser. No. 10/786,766, filed Feb. 24, 2004, which is a continuation-in-part of application Ser. No. 10/754,365, filed Jan. 8, 2004 now U.S. Pat. No. 6,950,239, and a continuation-in-part of application Ser. No. 10/775,793, filed Feb. 9, 2004 now U.S. Pat. No. 6,950,237, all of which are commonly owned, and which are herein incorporated by reference for all purposes.

TECHNICAL FIELD

This invention generally relates to a field emission device, and more particularly to a method for forming a field emission device including an electron emitting array.

BACKGROUND

Field emitting devices are generally found in a variety of applications, such as flat panel displays (FPDs), ion guns, electron beam lithography, high energy accelerators, free electron lasers, electron microscopes and the like. A typical field emitting device includes a cathode and a plurality of field emitter tips, a grid closely spaced to the emitter tips and an anode spaced further from the cathode. Voltage induces emission of electrons from the tips, through the grid, toward the anode.

FIG. 1 is a simplified illustration of a conventional triode-type field emission device 100 including an emitter 102 for emitting electrons, a gate electrode 104 for controlling the amount of electrons generated from emitter 102, and an anode 106 positioned above the gate electrode 104. A current is selectively applied to emitter 102 from the source electrode 108, which is dependent on the voltage applied to the gate electrode 110 of the transistor. A high voltage for discharging electrons from emitter 102 is applied to the gate electrode 104.

The cathode material characteristics are important in predicting performance. Cathode materials are typically metal, such as Mo and the like, or semiconductor, such as Si and the like. For metal and semiconductor materials, the control voltage required for emission is relatively high. The high control voltage increases damage due to ion bombardment and surface diffusion on the cathode tips and necessitates high power densities to produce the required emission current density. The fabrication of uniform sharp tips has been heretofore difficult, tedious and expensive, especially over a large area.

Another type of emitter is known as nanoscale conductors have recently emerged as potentially useful electron field emitters. Nanoscale conductors are tiny conductive nanotubes (hollow) or nanowires (solid). Typically, nanoscale conductors are grown in the form of randomly oriented, needle-like or spaghetti-like powders that are not easily or conveniently incorporated into a field emitter device. Due to this random configuration, the electron emission properties are not fully utilized or optimized. Many nanoscale conductor tips may be buried in the mass.

Consequently, there is a need for an improved method of forming emitters for use in field emission devices.

SUMMARY

The present invention provides a method for manufacturing electron emitters for field emission devices and a field emission device manufactured by such method for use in flat panel displays and the like.

In one aspect of the present invention, a method is provided for forming a device including electron emitters. The method includes exposing a first face of a sheet of bundled fiber segments to a reactive liquid to allow first ends of the fiber segments to react with the reactive liquid to remove material therefrom. A coating material is deposited on the first face which has the material removed. The method also includes exposing a second face of the sheet of bundled fiber segments to a reactive liquid to allow second ends of the fiber segments to react with the reactive liquid to remove material therefrom to expose the coating material.

In another aspect of the present invention, a field emission device is provided. The field emission device includes a cathode plate formed by exposing a first face of a sheet of bundled fiber segments to a reactive liquid to allow first ends of the fiber segments to react with the reactive liquid to remove material therefrom; depositing a coating material on the first face with the material removed; and exposing a second face of the sheet of bundled fiber segments to a reactive liquid to allow second ends of the fiber segments to react with the reactive liquid to remove material therefrom to expose the coating material. The field emission device also includes an anode plate formed by providing a transparent substrate having a transparent conductive material deposited thereon; forming a dielectric spacer on the transparent substrate; and etching selective areas of the dielectric spacer to form chambers for containing color phosphors. The field emission device can also include a patterned gate electrode layer fabricated either on the second face of the cathode plate or on top of the spacer layer of the anode plate. The anode plate and the cathode plate are formed together to align the etched selective areas with the exposed coating material.

In yet another aspect of the present invention, a method is provided forming a device including emitters. The method includes providing a sheet of fiber segments, each fiber segment having a first end and a second end; exposing the first ends of the fiber segments to a reactive liquid to allow the reactive liquid to react with the first ends to remove material therefrom; depositing a coating material on the first ends; depositing a dielectric layer on the coated first ends and attaching a substrate thereto; exposing the second ends of the fiber segments to a reactive liquid to allow the reactive liquid to react with the second ends to remove material therefrom to expose the coating material; providing an anode plate including chambers containing color phosphors; fabricating gate electrodes either on the second face of the cathode plate or on top of the spacer layer of the anode plate; and aligning the chambers with the exposed coating material to form a field emitter device.

The process of manufacturing field emitters in accordance with the present invention is easier than typical emitter manufacturing processes, because the process is simple and uncomplicated. The process of the present invention does not require individually patterning any structures for the formation of the emitters.

No clean room or other specialized equipment is necessary in the manufacturing process. Moreover, the process of the present invention is especially suited for the manufacture of large single piece field emitter arrays, such as field emitter arrays on the order of 70 in.×70 in or larger.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
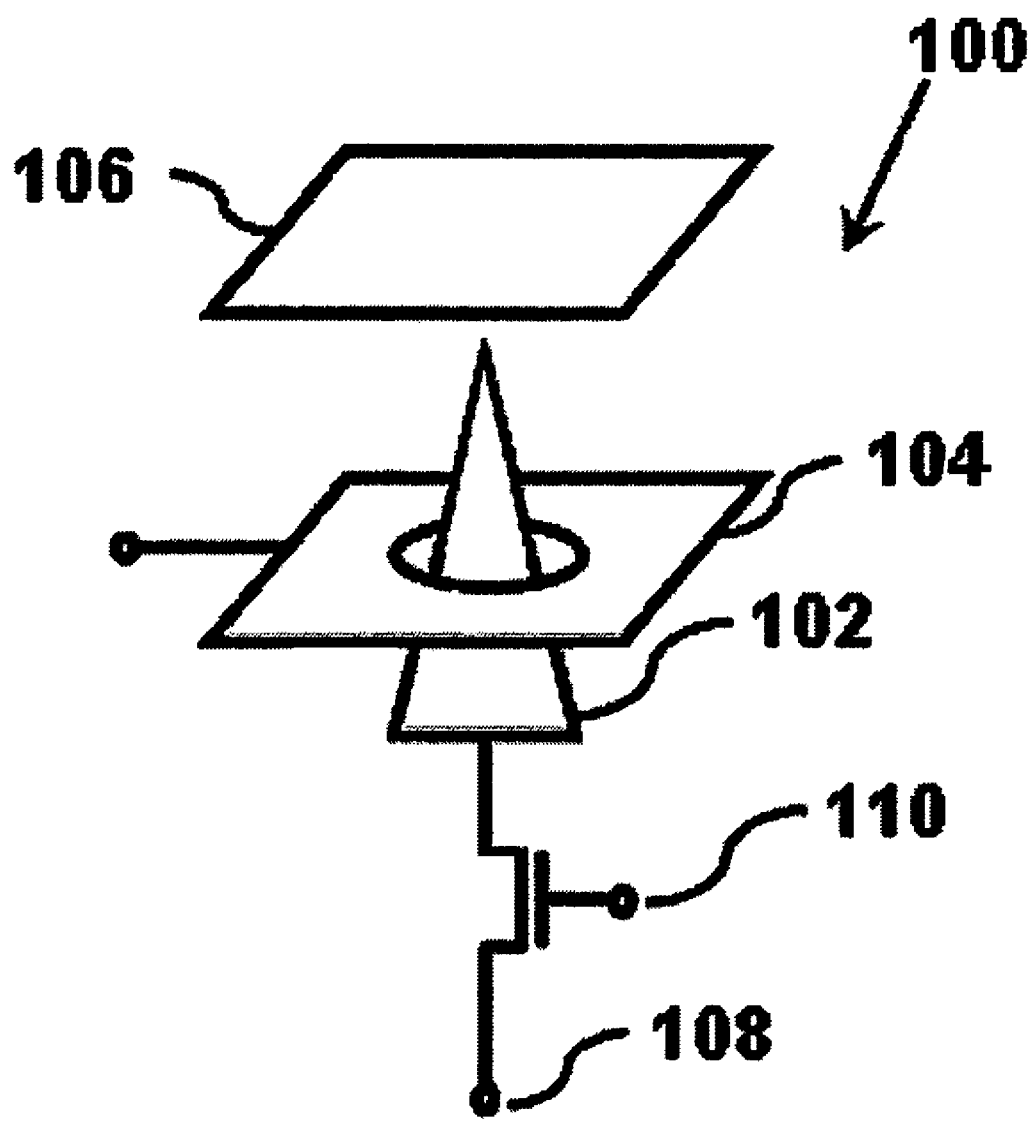
FIG. 1 is a simplified illustration of a typical field emission device.
Figure 2:
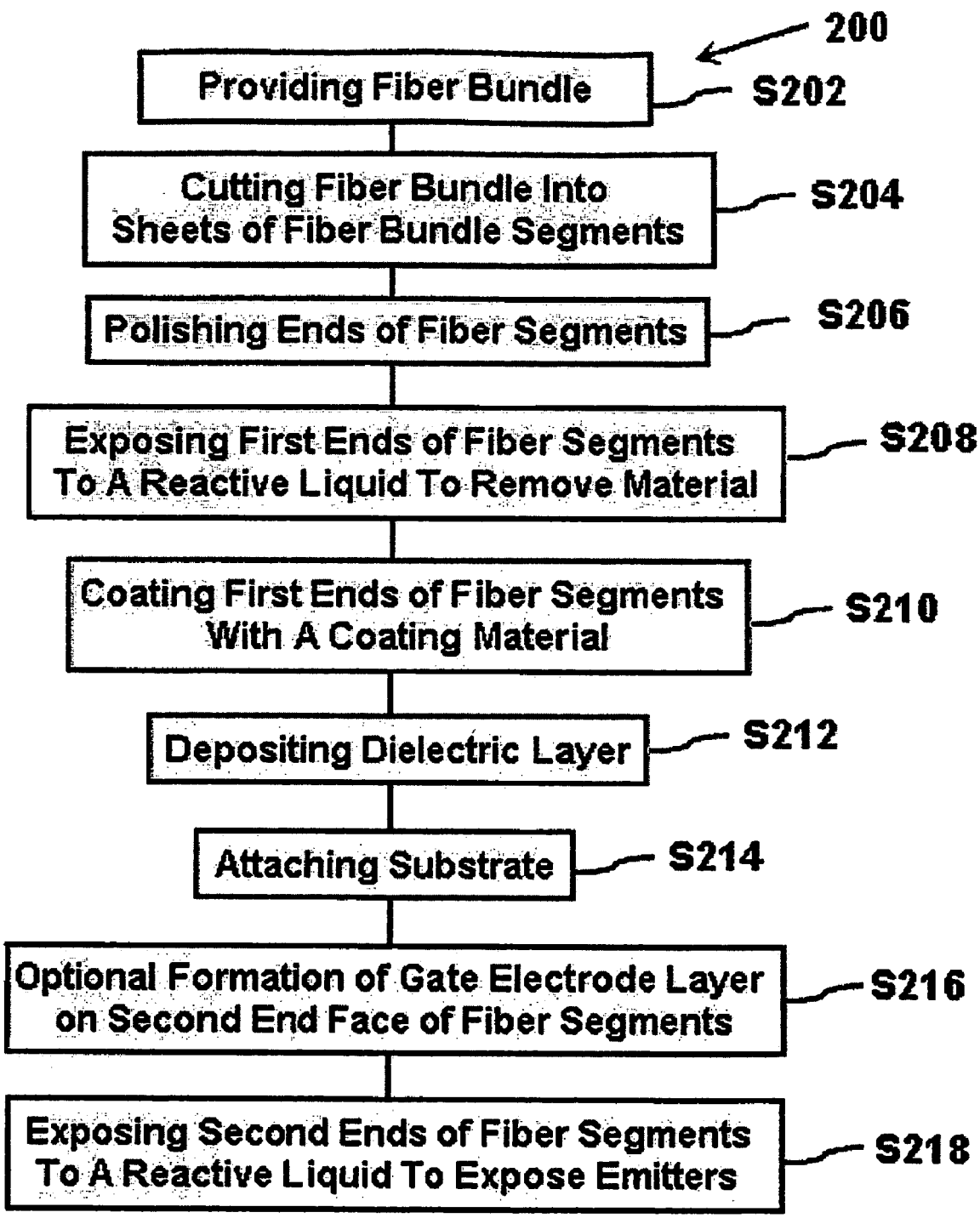
FIG. 2 is a flowchart illustrating a process for forming a cathode plate in accordance with an embodiment of the present invention.

FIG. 2 is a flowchart illustrating a process 200 for forming an electron emitter array in accordance with an embodiment of the present invention. Process 200 includes forming or otherwise providing a bundle of cylindrical members, such as cylindrical rods or fibers made of glass ($SiO_2$), plastic and the like (s202). The bundle of cylindrical members is cut or sliced into a sheet or sheets of cylindrical member segments (s204), where each sheet has a first face and a second face.

The ends of each cylindrical member segment in each sheet can be polished so as to create a smooth end (s206). In one embodiment, process 200 may also include polishing one or both faces of the sheets to form the face of the sheet into a surface that varies from a flat surface to a more rounded or curved surface.

The ends of each member segment in the first face of the sheet are etched to form etched or modified ends (s208). In one embodiment, the first face of each sheet of cylindrical member segments is subjected to a reactive liquid, in the form of a liquid bath or a liquid spray. In one embodiment, the first face of the sheet of cylindrical member segments is at least partially immersed into the liquid bath, which includes an etching liquid. In another embodiment, a suitable etching liquid is sprayed on the sheet of cylindrical member segments. As described in greater detail below, the etching liquid etches or modifies each member segment by removing material therefrom, generally first from the periphery of each member segment. The removal of material from each bundled member segment creates open spaces or "cells" between adjacent member segments. The cells can resemble a trough having a wide top end, and a bottom end that defines a narrower end.

The newly formed array of modified end member segments can be coated (s210) with a low electron affirnity or low energy electron emissive conducting material for supplying electrons. The emissive conducting material is deposited on the modified ends and thus fills the cells.

As described in greater detail below, once the array of modified end member segments is coated, they can be covered with a protective layer of a dielectric or a polymer material (s212). The dielectric layer can be flattened by polishing, for example, and attached to a substrate, such as a glass substrate (s214) or a similarly supportive substrate.

In one embodiment, the second face of each sheet of cylindrical member segments is subjected to a reactive liquid, in the form of a liquid bath or a liquid spray. In one embodiment, the second face of the sheet of cylindrical member segments is at least partially immersed into the liquid bath, which includes an etching liquid. In an alternative embodiment, a suitable etching liquid is sprayed on the second face of the sheet of cylindrical member segments. Optionally, a metallic conducting gate electrode layer may be deposited and patterned on the second face of the sheet of cylindrical member segments prior to etching (s216). In this embodiment, the gate electrode can act as an etching mask. Alternatively, as described in greater detail below, the gate electrode can be fabricated on the anode plate.

As also described in greater detail below, the etching liquid etches or modifies each member segment. The removal of material from each bundled member segment creates cells that are in line with the cells formed on the first face between adjacent member segments. The depth of the cell formation on the second face reaches a depth such that the low energy electron emissive conducting material that fills the narrow end of the cells on the first face of the sheet of etch modified member segments is exposed (s218) to the second face. The exposed low energy electron emissive conducting material, generally in the shape of a narrow edge, forms electron emitters that are viewable from the second face.

Figure 3:
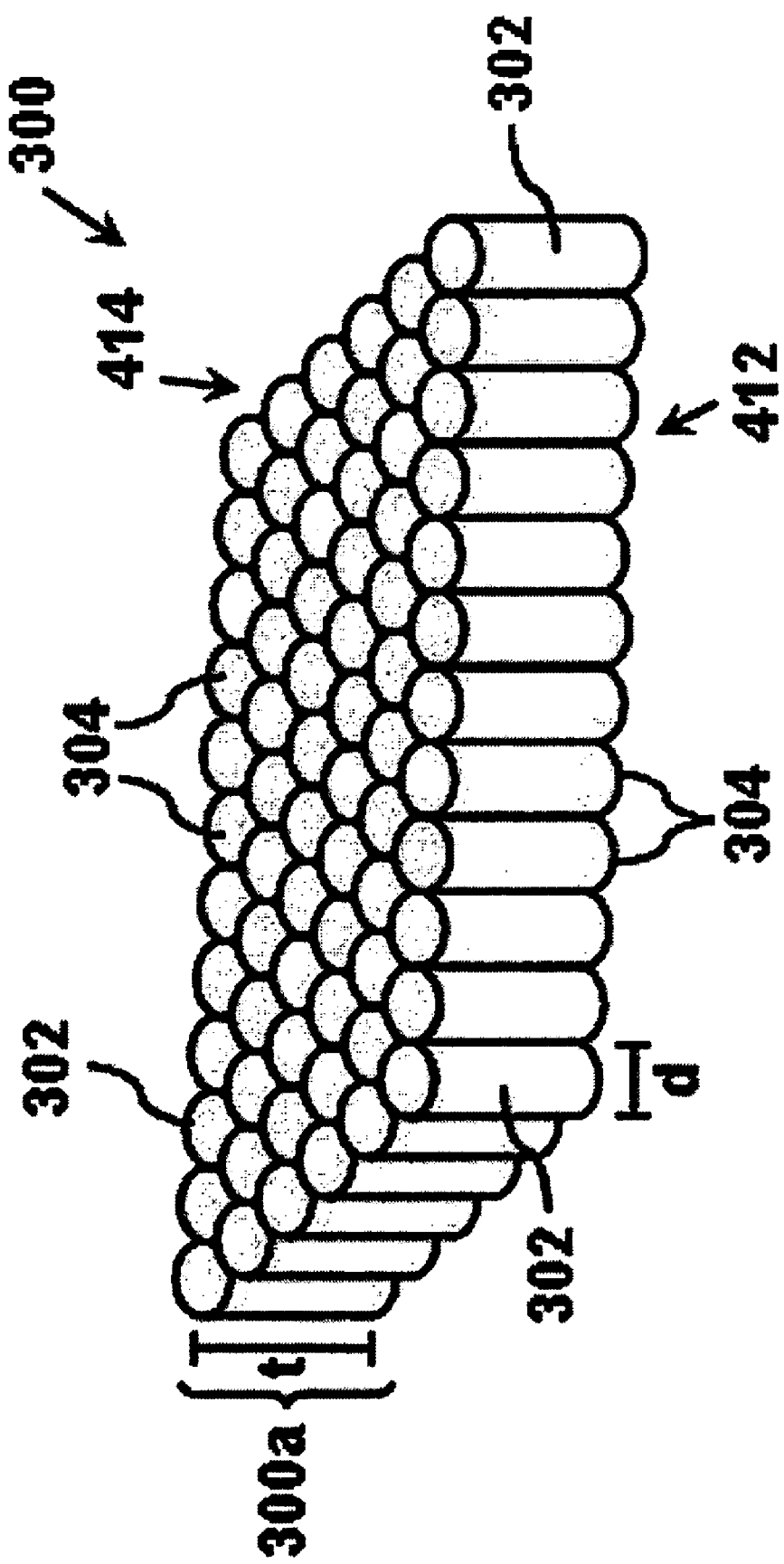
FIG. 3 is a simplified illustration of a sheet of cylindrical members in accordance with an embodiment of the present invention.

FIG. 3 is a simplified illustration of a bundle 300 of a plurality of cylindrical member segments 302 in accordance with an embodiment of the present invention. In one embodiment, each cylindrical member segment 302 can be a rod, cylinder, fiber or other similarly shaped member. Alternatively, the cylindrical member segments can have a non-circular cross-section, for example, a square or other polygonal cross-section.

The plurality of cylindrical member segments 302 is bound together along a longitudinal axis of each member. In one embodiment, a cross-section of the bundle of cylindrical members 302 can have a honey-comb like configuration. In other embodiments, the cross-section of the bundle of member segments 302 may have a square, rectangular or other suitable cross-sectional configuration.

In one embodiment, cylindrical member segments 302 can be bound together to form bundle 300 using any suitable adhesive, such as a UV curable adhesive and the like. Beneficially, when using a UV curable adhesive, to form bundle 300 of cylindrical member segments 302, any gaps that may exist between the members are filled with the adhesive before the adhesive is cured.

The diameter and length of each cylindrical member segment 302 that make up bundle 300 are generally dictated by the application.

As shown in FIG. 3, to ensure the proper thickness, bundle 300 can be cut into a single layer or sheet 300a to form an array of cylindrical member segments 302 having a thickness t. In one embodiment, with no intent to limit the invention, the thickness of each sheet 300a of cylindrical member segments 302 can be between about 100 µm and several millimeters. Bundle 300 can be cut into sheet 300a using conventional cutting technologies, such as dicing saws and cutting wheels.

In one embodiment, the diameter d of each cylindrical member segment 302 in sheet 300a can be standard single mode fiber, which has a core size of about 9 µm and an overall diameter of about 125 µm. In general, the diameter of each cylindrical member 302 can range from between about less than 1 mm and about several millimeters depending on the application. In another embodiment, cylindrical member segment 302 can be multi-mode fibers.

In one embodiment, ends 304 of first face 412 of sheet 300a of cylindrical member segments 302 may be modified using an etching process in accordance with an embodiment of the present invention.

Figure 4:
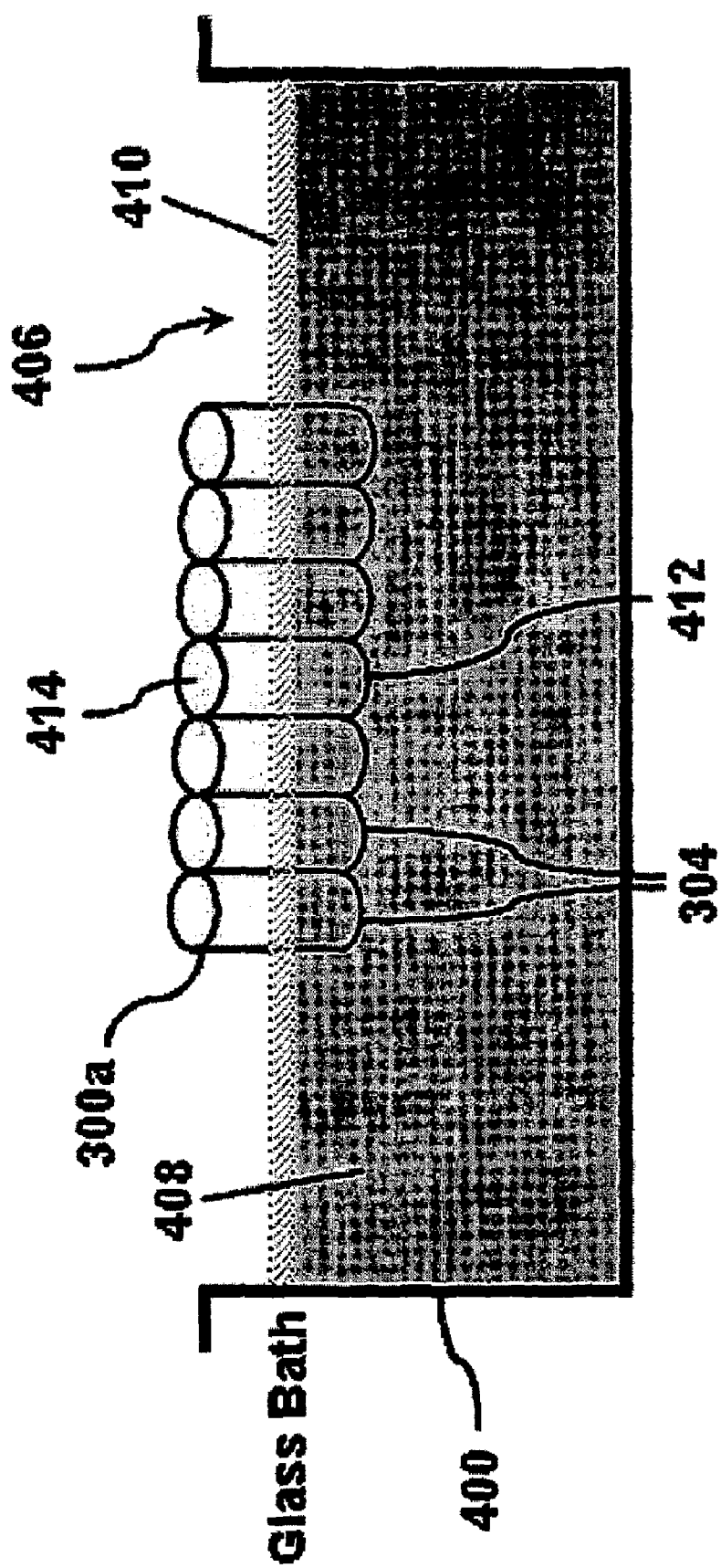
FIG. 4 is a simplified illustration of an etching bath in accordance with an embodiment of the present invention.

Referring to FIG. 4, in one embodiment, the modification of ends 304 can be accomplished by placing ends 304 of first face 412 of sheet 300a into a liquid bath container 400, which includes a liquid bath 406.

Liquid bath 406 can include any desired formulation of chemicals suited for etching fibers. In one embodiment, liquid bath 406 includes an HF acid 408. A thin layer of oil can be added to liquid bath 406, which forms an oil film 410 on the surface of HF acid 408. The addition of oil film 410 on the surface of the HF acid 408 creates a barrier on the acid surface to control the depth of the etching process. Generally, the depth of the etch is controlled by the depth of the immersion of ends 304, however, the HF acid can in some instances "climb up" the member segments passed that portion which is immersed in the HF acid, causing the unwanted etching of the non-immersed portions. Oil film 410 acts as an etch stop and prevents the HF acid from being able to climb beyond oil film 410.

Ends 304 on first face 412 of sheet 300a are placed in liquid bath 406 for a specific duration of time long enough to perform the desired amount of etching. The time desired for etching is a function of the material of each member segment 302 of sheet 300a, the composition and concentration of the liquid in bath container 400.

Figure 5:
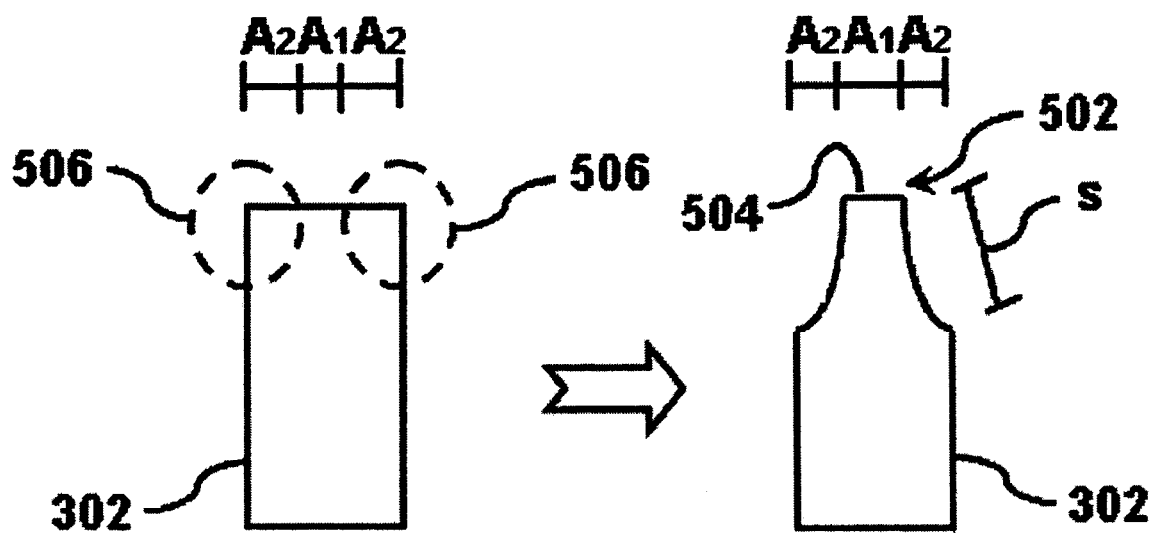
FIG. 5 is a simplified illustration of an individual member segment before and after being subjected to an etch process in accordance with an embodiment of the present invention.

In one embodiment, shown in FIG. 5, each member segment 302 of sheet 300a (a single member segment 302 is shown for clarity) includes a core area $A_1$ and a peripheral area $A_2$ surrounding core area $A_1$. In operation, liquid bath 406 affects peripheral area $A_2$ before it affects core area $A_1$, since the peripheral area $A_1$ is in direct contact and has more exposed surface area to HF acid 408. This is especially true at the corner areas 506, since the top and side of the corner areas are simultaneously exposed. The type of fiber being used to form the member segments also can affect how the etched area is formed. The core area $A_1$ of some fibers is made more pure than the peripheral area $A_2$—the less pure area is more susceptible to the etching liquid.

The length of modified end 502 is controlled, for example, by the depth of immersion of member segment 302 into HF acid 408 below oil film 410. The sharpness (or slope) S of the end portion 504 of modified end 502, however, is controlled by the length of time that member segment 302 is held in liquid bath 406 and the concentration of HF acid 408.

Beneficially, the etch process of the present invention is a slow enough process that the manufacturer can continually check the progress of the etching process, and can remove sheet 300a from the etch bath at any time that the desired size of end portion 504 has been arrived at.

Figure 6:
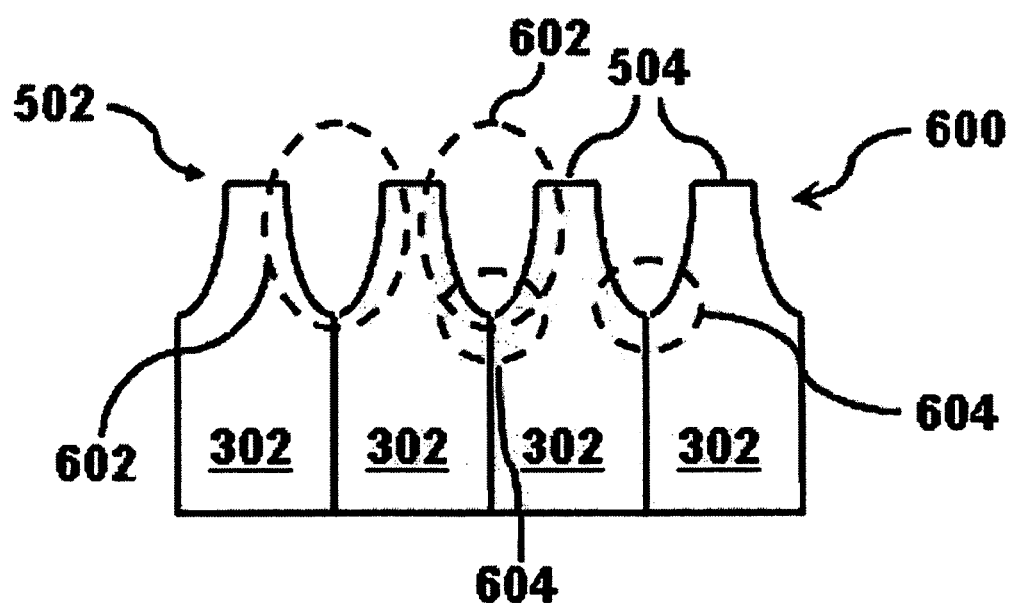
FIG. 6 is a simplified illustration of an array of etched fibers in accordance with an embodiment of the present invention.

The structure resulting from the etching process is an array 600 of modified end member segments 302 as shown in FIG. 6. During the etching process, material is removed from each member segment 302, which creates spaces or cells 602 between adjacent etched member segments 302. Cells 602 form a narrow edge 604 at a bottom portion or trough of each cell 602. The size of array 600 is limited only to the size of the originally provided bundle of fibers, and thus array 600 can be designed to substantially any array size.

Figure 7A:
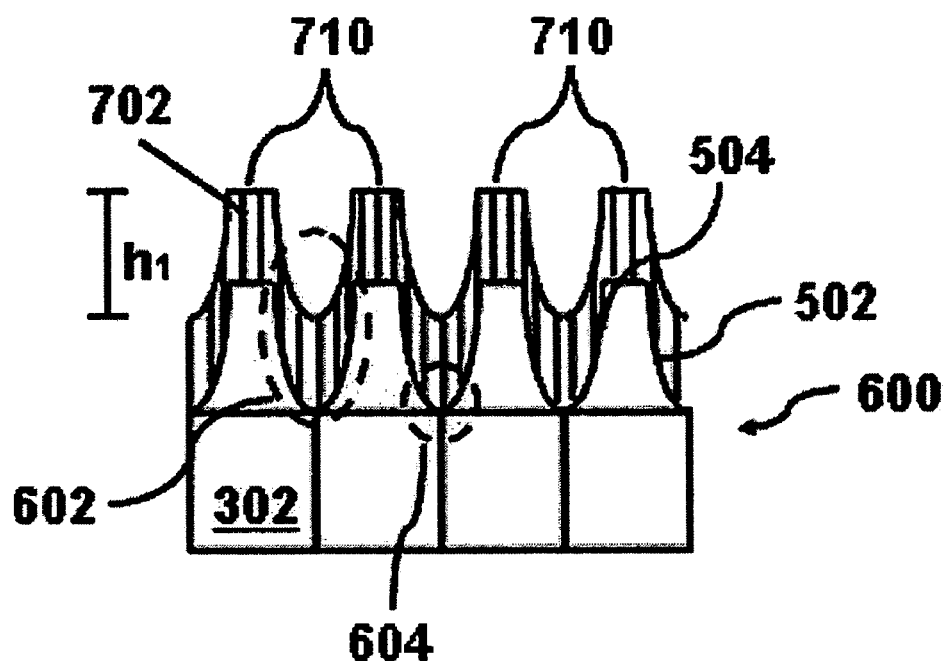
FIGS. 7A–7C are simplified illustrations of a process of forming a cathode plate in accordance with an embodiment of the present invention.

As shown in FIG. 7A, the resulting array 600 can be subjected to well known deposition techniques, such as evaporation, sputtering and the like, to deposit a low electron affinity or low energy electron emissive conducting material 702 thereon. Low energy electron emissive material 702 builds up upon end portions 504 and substantially fills cells 602. The end portions 504 of member segments 302 do not necessarily need to have a "sharp" tip. Rather, the end portion 504 can be made substantially blunt allowing the low energy electron emissive coating to build up to any desired height $h_1$. The cells 602 formed between adjacent modified end member segments 302 on array 600 are substantially filled with low energy electron emissive material 702. In general, coating 702 follows the contour of the modified end member segments.

Low energy electron emissive conductive coating 702 is provided to supply free electrons under an external (gate) bias voltage. The electrons can be accelerated to reach a colored phosphor containing chamber on an anode plate, as described in detail below.

The low energy electron emissive conducting material coating 702 can be any suitable coating that provides the necessary functionality for a particular application. In one embodiment, each modified end member segment 502 is coated with a low energy electron emissive conducting material, such as PdOx, α-C, Pd, Mo, Ni, Cr, Cu, Au, Pt, Ir, diamond and the like.

The thickness of the low energy electron emissive conductive coating 702 is a function of the lifetime that the emitter being formed is expected to function in a particular application. In one embodiment, the thickness of low energy electron emissive coating 702 can be from about 100 nm to more than about a few microns depending on the application.

Figure 7B:
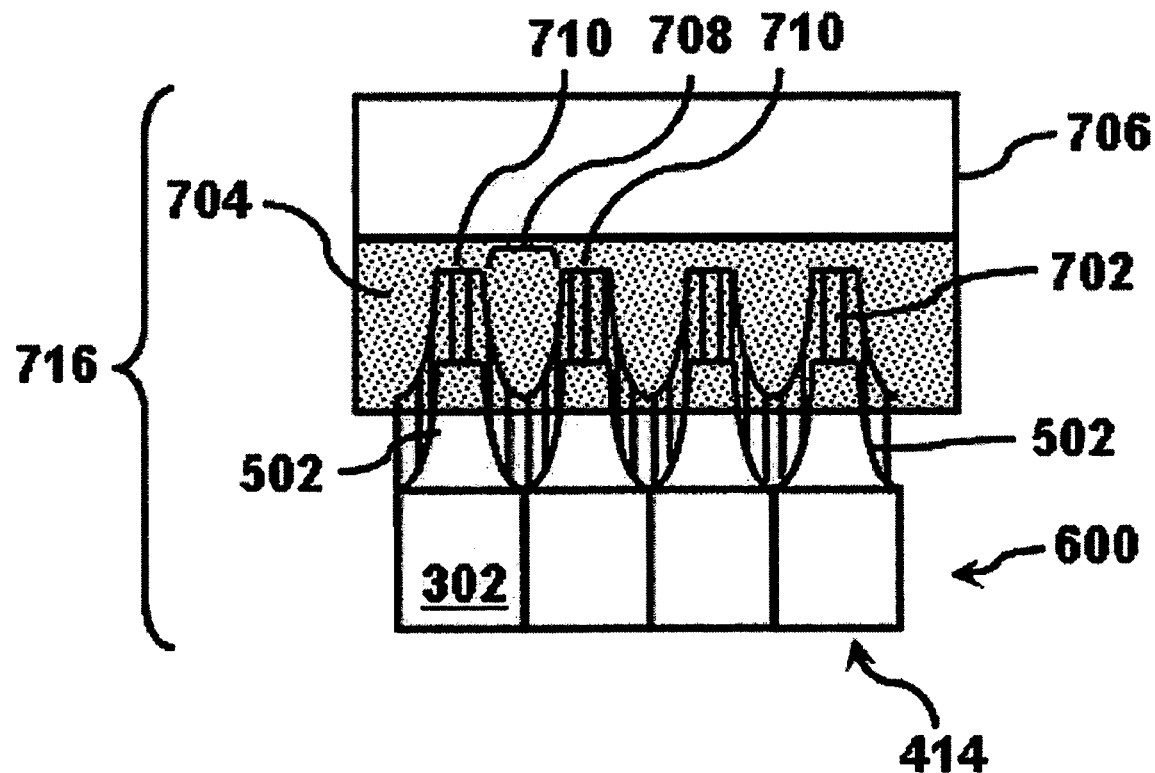

As shown in FIG. 7B, after coating array 600, a dielectric layer 704 is formed on array 600, which covers each modified end 502 and coating 702 to fill in the spaces 708 formed between the built up columns 710 of coating 702. Dielectric layer 704 can be any suitable dielectric material, such as a polymer, spin-on-glass (SOG), $SiO_2$, $Si_3N_4$ and the like applied using well known deposition, spin-on or spray techniques.

Dielectric layer 704 may follow the contour or shape of the end face of the low energy electron emissive coating 702. Dielectric layer 704 can be flattened by, for example, standard polishing techniques know to those of skill in the art. A substrate material 706 is disposed and coupled or bonded on the flattened dielectric layer 704 to form resulting structure 716. Substrate 706 can be, for example, a glass substrate or other similarly supportive substrate material.

Referring again to FIG. 7B, the resulting structure 716 has second face 414 of the original sheet 300a (FIG. 3) extending out therefrom. Second face 414 is the face of resulting structure 716 disposed opposite from substrate 706.

In one embodiment, ends 304 of second face 414 of sheet 300a of cylindrical member segments 302 may also be modified using the etching process in accordance with an embodiment of the present invention.

Referring again to FIG. 4, the modification can be accomplished by placing ends 304 of second face 414 into liquid bath container 400, which includes liquid bath 406, or, alternatively, by spraying ends 304 with a suitable etching liquid.

Figure 7C:
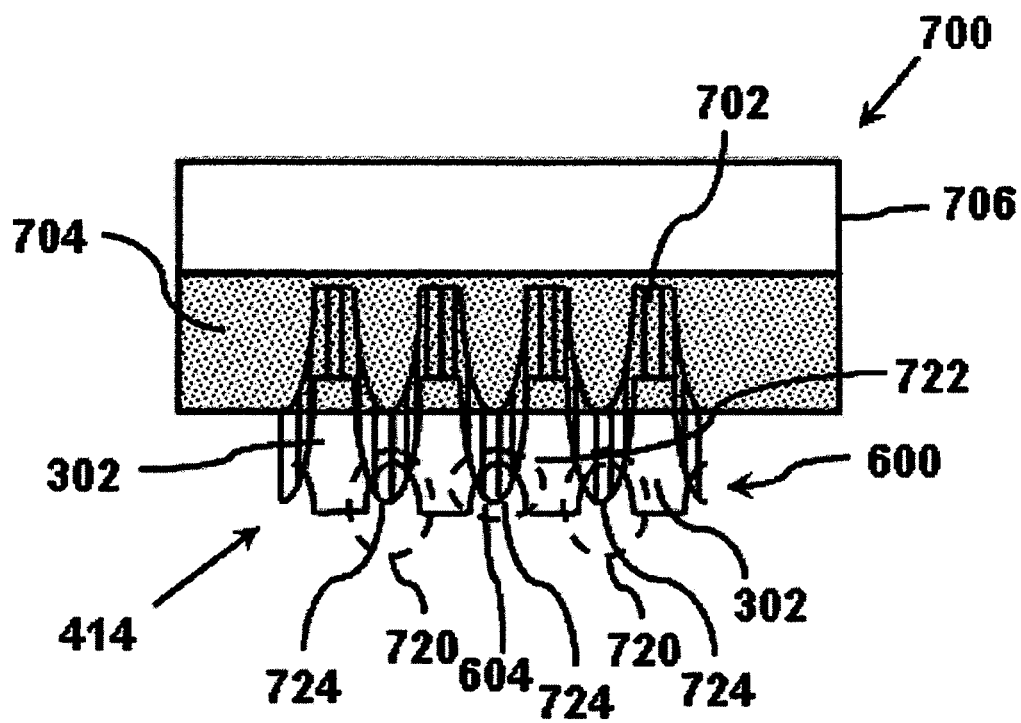

FIG. 7C shows the result of the etching of second face 414 in accordance with an embodiment of the present invention. The etching process removes material from second face 414 as described above with reference to FIG. 5. In one embodiment, the etching of second face 414 and thus, each member segment 302, forms cells 720. Cells 720 are aligned with cells 602, which have been substantially filled with coating material 702. The etching of second face 414 continues until the depth of cell 720 exposes at least a portion of coating material 702, such as edge 604, as shown at element 722. Edge 604 (FIG. 6) protrudes into cell 720 to form emitters 724. The resulting structure is cathode plate 700.

Figure 8A:
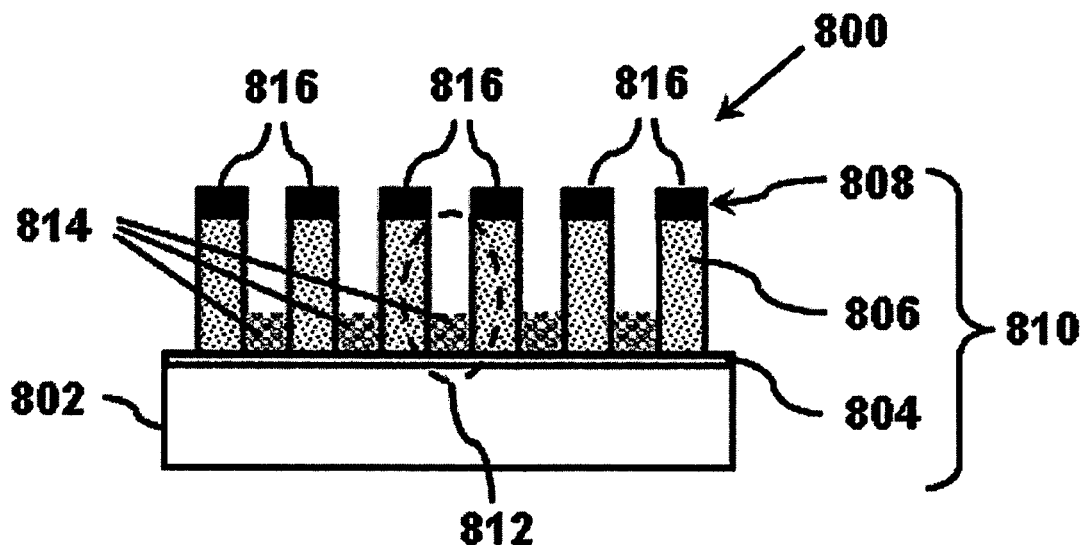
FIG. 8A is a simplified illustration of an anode structure formed by lithographic patterning having chambers formed to contain RGB colored phosphors in accordance with an embodiment of the present invention.

FIG. 8A illustrates the formation of an anode plate in accordance with an embodiment of the present invention. The formation of anode plate 800 includes providing a transparent substrate 802, such as a glass or similar type of substrate. A transparent conducting material 804, such as Indium Tin Oxide (ITO) and the like, is deposited on glass substrate 802 to form an anode electrode. In one embodiment, conducting material 804 can be patterned or etched into any desired design or pattern.

Next, a suitable dielectric spacer 806, such as SiO$_2$, SOG, polymers and the like, is deposited over transparent conducting material 804. Dielectric spacer 806 can be deposited using various deposition techniques, such as evaporation, sputtering, CVD, spin-on coating and the like.

A metal or conducting layer 808 is deposited on spacer 806. The resulting structure 810 can then be patterned into gate electrodes 816 using, for example, optical lithography techniques or other similar patterning techniques.

In an alternative embodiment, gate electrode layer 808 can be formed on cathode plate 700a.

Figure 7D:
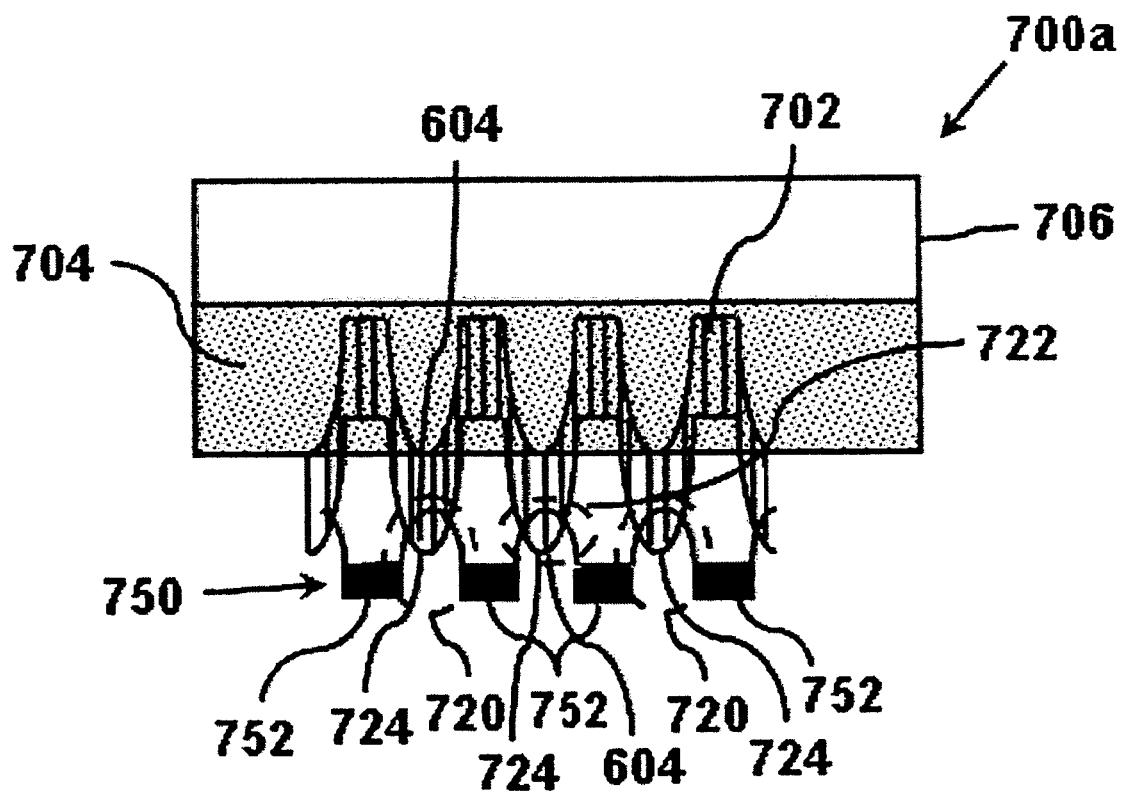
FIG. 7D is a simplified illustration of a cathode plate formed in accordance with an alternative embodiment of the present invention.

In the alternative embodiment, after arriving at structure 716, shown in FIG. 7B, a metal or conducting layer 750 (FIG. 7D) can be deposited on second face 414 using well known techniques, such as evaporation, sputtering, and the like. Metal conducting layer 750 forms a gate electrode layer, which can be patterned into gate electrodes 752 through optical lithography and the like. An optional dielectric layer, such as SiO$_2$, Si$_3$N$_4$, polymer and the like, can be inserted between gate electrode layer 750 and second face 414 if necessary or desired. Ends 304 of cylindrical member segments 302 of second face 414 of sheet 300a may then be modified using the etching process in accordance with an embodiment of the present invention. Referring again to FIG. 4, the modification can be accomplished by placing ends 304 of second face 414 into liquid bath container 400, which includes liquid bath 406.

The gate metal can be used as a mask (self-aligned), to allow the etching process to remove material from second face 414 as described above with reference to FIG. 5. In this alternative embodiment, the etching of second face 414 and thus, each member segment 302, forms cells 720. Cells 720 are aligned with cells 602 on first face 412, which have been filled with coating material 702. The etching of second face 414 continues until the depth of cell 720 exposes at least a portion of coating material 702, such as edge 604, as shown at element 722. Edge 604 protrudes into cell 720 to form emitters 724. The resulting structure is cathode plate 700a with gate electrodes 752.

Figure 8B:
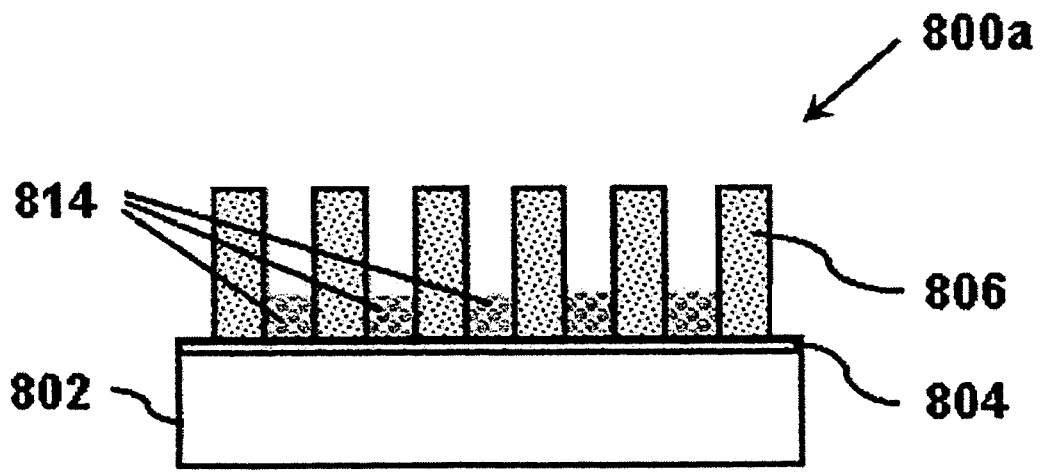
FIG. 8B is a simplified illustration of an anode structure formed by lithographic patterning having chambers formed to contain RGB colored phosphors in accordance with an alternative embodiment of the present invention.

Referring now to FIGS. 8A and 8B, selective areas of dielectric spacer 806 are etched back forming chambers 812 using gate electrodes 816 as etch masks (800 in FIG. 8A), or separate patterning techniques well known to those skilled in the art in the embodiment not having gate electrodes 816 (800a in FIG. 8B). Below references to cathode plate 700 and anode plate 800 should be deemed as also applying to cathode plate 700a and anode plate 800a as appropriate.

In either embodiment, each chamber 812 can be filled with colored phosphors 814. Phosphors 814 include red, green and blue (RGB) color phosphors. The resulting anode plate 800 can then be combined with the cathode plate as described below.

Figure 9:
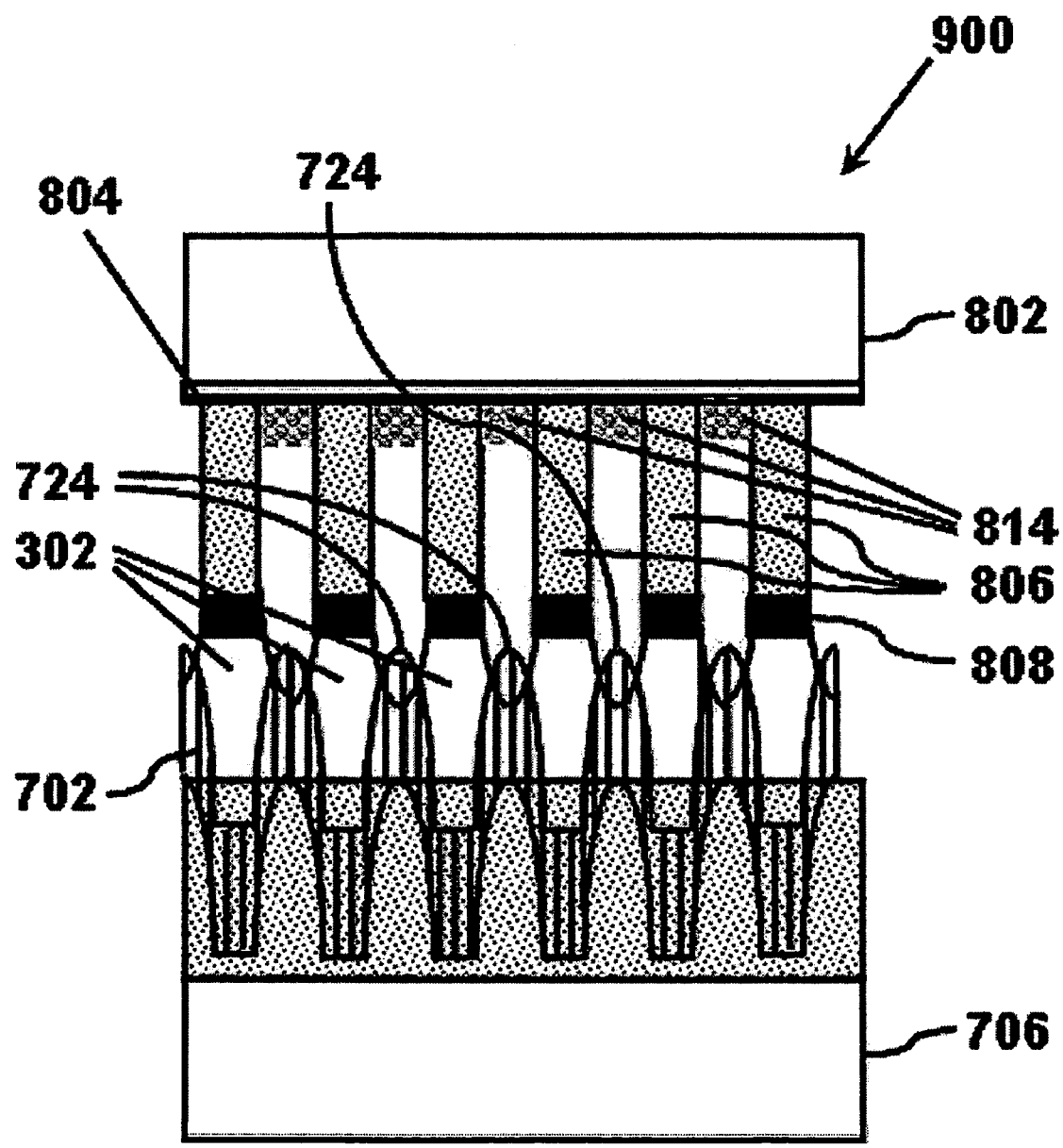
FIG. 9 is a simplified illustration of a field emission device in accordance with an embodiment of the present invention.

FIG. 9 shows an embodiment of a field emission device (FED) 900 in accordance with an embodiment of the present invention. Once having formed cathode plate 700 and anode plate 800, the two plates can be aligned and joined. The remaining, unetched portions of dielectric spacer 806 having gate electrodes 808 are aligned, such that each phosphor containing chamber 812 on anode plate 800 corresponds to an emitter or emitters 724 on cathode plate 700.

A seal or gasket can be positioned between anode plate 800 and cathode plate 700 (or 700a) to allow the combined plates to be pumped to vacuum and sealed.

In this configuration, electrons emitted from exposed emitters 724 can be accelerated to strike the RGB phosphors in chambers 812 to provide a colored light emission.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A field emission device comprising:
    a cathode plate formed by:
        exposing a first face of a sheet of bundled fiber segments to a reactive liquid to allow first ends of said fiber segments to react with said reactive liquid to remove material therefrom, wherein outer surfaces of adjacent fiber segments are in contact with each other;
        depositing a coating material on said first face with said material removed; and
        exposing a second face of said sheet of bundled fiber segments to a reactive liquid to allow second ends of said fiber segments to react with said reactive liquid to remove material therefrom to expose said coating material; and
    an anode plate formed by:
        providing a transparent substrate having a transparent conductive material deposited thereon;
        forming a dielectric spacer on said transparent substrate; and
        etching selective areas of said dielectric spacer to form chambers for containing color phosphors;

said anode plate and said cathode plate formed together to align said etched selective areas wit said exposed coating material.

2. The field emission device of claim 1, wherein said transparent conductive material deposited on said transparent substrate is patterned to form anode electrodes.

3. The field emission device of claim 1, wherein said formed together anode plate and cathode plate comprises a seal to allow said formed together anode plate and cathode plate to be pumped into vacuum.

4. The field emission device of claim 1, wherein said reactive liquid comprises a bath of HF acid.

5. The field emission device of claim 1, wherein said reactive liquid comprises a spray of HF Acid.

6. The field emission device of claim 1, wherein said coating material comprises a low electron affinity material taken from die group consisting of $\alpha$-C, $PdO_x$, Pd, Mo, Ni, Cr, Cu, Au, Pt, Ir, and diamond.

7. The field emission device of claim 1, wherein the fiber segments are non-conductive.

8. The field emission device of claim 7, wherein the fiber segments are made of glass or plastic.

9. The field emission device of claim 1, wherein exposing the second face forms tapered ends at the second face of the sheet of bundled fiber segments.

* * * * *